(12) United States Patent
Haugen et al.

(10) Patent No.: US 11,851,280 B2
(45) Date of Patent: Dec. 26, 2023

(54) TUBE CONVEYOR WITH BELTING HAVING LONGITUDINAL COGS

(71) Applicant: ContiTech Transportbandsysteme GmbH, Hannover (DE)

(72) Inventors: Chad R. Haugen, Wahpeton, ND (US); Mark Beyer, Wahpeton, ND (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 17/701,005

(22) Filed: Mar. 22, 2022

(65) Prior Publication Data

US 2022/0306390 A1 Sep. 29, 2022

Related U.S. Application Data

(60) Provisional application No. 63/166,761, filed on Mar. 26, 2021.

(51) Int. Cl.
| | |
|---|---|
| *B65G 15/44* | (2006.01) |
| *B65G 15/42* | (2006.01) |
| *B65G 21/20* | (2006.01) |
| *B65G 15/46* | (2006.01) |
| *B65G 15/56* | (2006.01) |
| *B65G 15/08* | (2006.01) |

(52) U.S. Cl.
CPC ............. *B65G 15/44* (2013.01); *B65G 15/42* (2013.01); *B65G 15/46* (2013.01); *B65G 15/56* (2013.01); *B65G 21/2081* (2013.01); *B65G 15/08* (2013.01)

(58) Field of Classification Search
CPC ........ B65G 15/44; B65G 15/42; B65G 15/46; B65G 15/56; B65G 21/2081; B65G 15/08
USPC ........................................................ 198/819
See application file for complete search history.

(56) References Cited

U.S. PATENT DOCUMENTS

| | | | |
|---|---|---|---|
| 6,170,646 B1 | 1/2001 | Kaeb | |
| 8,292,065 B1 * | 10/2012 | Neufeld | B65G 15/42 198/716 |
| 9,463,930 B2 * | 10/2016 | Minkin | B65G 15/40 |
| 9,637,322 B1 * | 5/2017 | Tratch | B65G 15/60 |
| 9,957,109 B2 * | 5/2018 | Kaeb | B65G 15/08 |
| 11,147,212 B2 | 10/2021 | Batu | |
| 2017/0094899 A1 * | 4/2017 | Webermann | A01D 57/20 |
| 2019/0350133 A1 * | 11/2019 | Batu | A01D 61/002 |
| 2020/0391954 A1 * | 12/2020 | Graff | B65G 21/2081 |
| 2022/0135335 A1 * | 5/2022 | Boursier | B65G 15/36 198/804 |

FOREIGN PATENT DOCUMENTS

CA 2421534 A1 12/2003

* cited by examiner

*Primary Examiner* — Mark A Deuble
(74) *Attorney, Agent, or Firm* — Gregory Adams

(57) ABSTRACT

A tube conveyor including a tube and a conveyor belt. The tube has a bore extending therethrough. The conveyor belt is movable through the tube bore. The conveyor belt includes a base and at least one first longitudinal cog. The base has a first edge and a surface. The at least one first longitudinal cog extends from the base surface. The at least one first longitudinal cog is oriented substantially parallel to the first edge.

16 Claims, 3 Drawing Sheets

TUBE CONVEYOR WITH BELTING HAVING LONGITUDINAL COGS

REFERENCE TO RELATED APPLICATION

This application claims priority to Provisional Applic. No. 63/166,761, filed on Mar. 26, 2021, the contents of which are incorporated herein by reference.

FIELD OF THE INVENTION

The invention relates generally to tube conveyors. More particularly, the invention relates to tube conveyors with belting having longitudinal cogs.

BACKGROUND OF THE INVENTION

Because of their ability to move large amounts of material, conveyor belts have been long used in industry. One area in which conveyor belts are extensively used is equipment for moving agricultural products and, in particular, agricultural equipment that is used for harvesting.

In certain agricultural equipment, objects are laterally loaded onto conveyors. There can be challenges associated with causing the objects to be accurately loaded onto the conveyors without spilling.

SUMMARY OF THE INVENTION

An embodiment of the invention is directed to a tube conveyor that includes a tube and a conveyor belt. The tube has a bore extending therethrough. The conveyor belt is movable through the tube bore. The conveyor belt includes a base and at least one first longitudinal cog. The base has a first edge and a surface. The at least one first longitudinal cog extends from the base surface. The at least one first longitudinal cog is oriented substantially parallel to the first edge.

Another embodiment of the invention is directed to a method of conveying product in a tube conveyor. A tube conveyor is provided that includes a tube and a conveyor belt. The tube has a bore extending therethrough. The conveyor belt includes a base and at least one first longitudinal cog. The base has a first edge and a surface. The at least one first longitudinal cog extends from the base surface. The at least one first longitudinal cog is oriented substantially parallel to the first edge. Product is placed on the conveyor belt. The conveyor belt is moved through the tube bore to convey the product with the tube conveyor. Lateral movement of the product on the conveyor belt is restricted as the conveyor belt is moving through the tube bore with the at least one longitudinal cogs.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
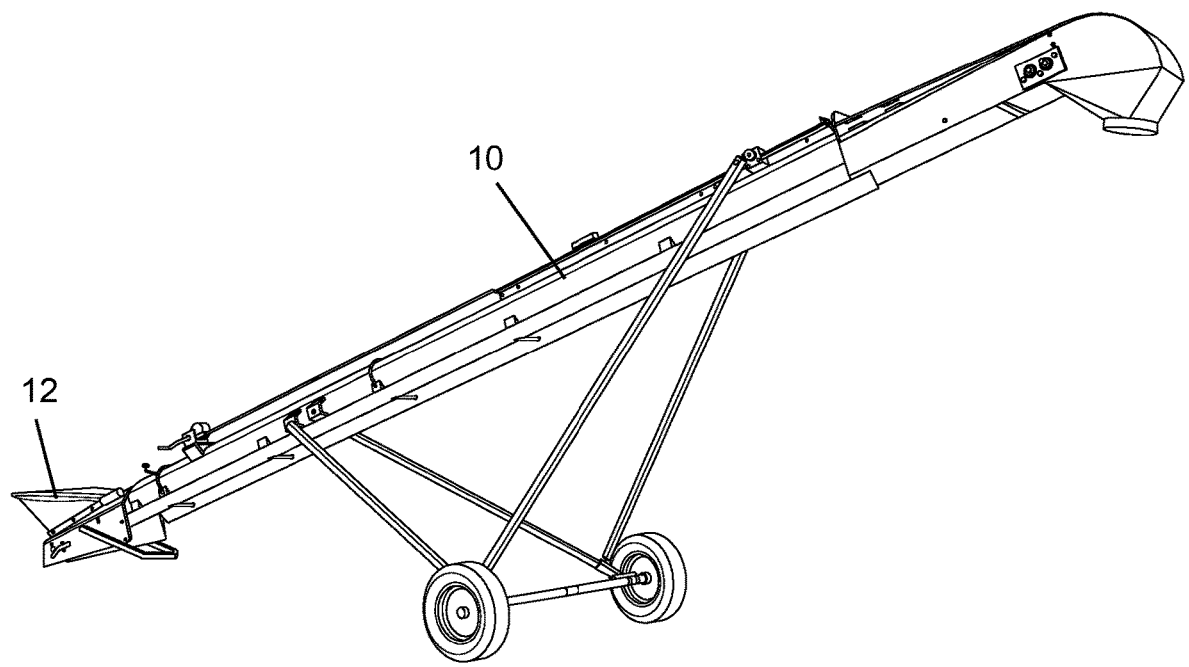
FIG. 1 is a side view of a tube conveyor.
Figure 2:
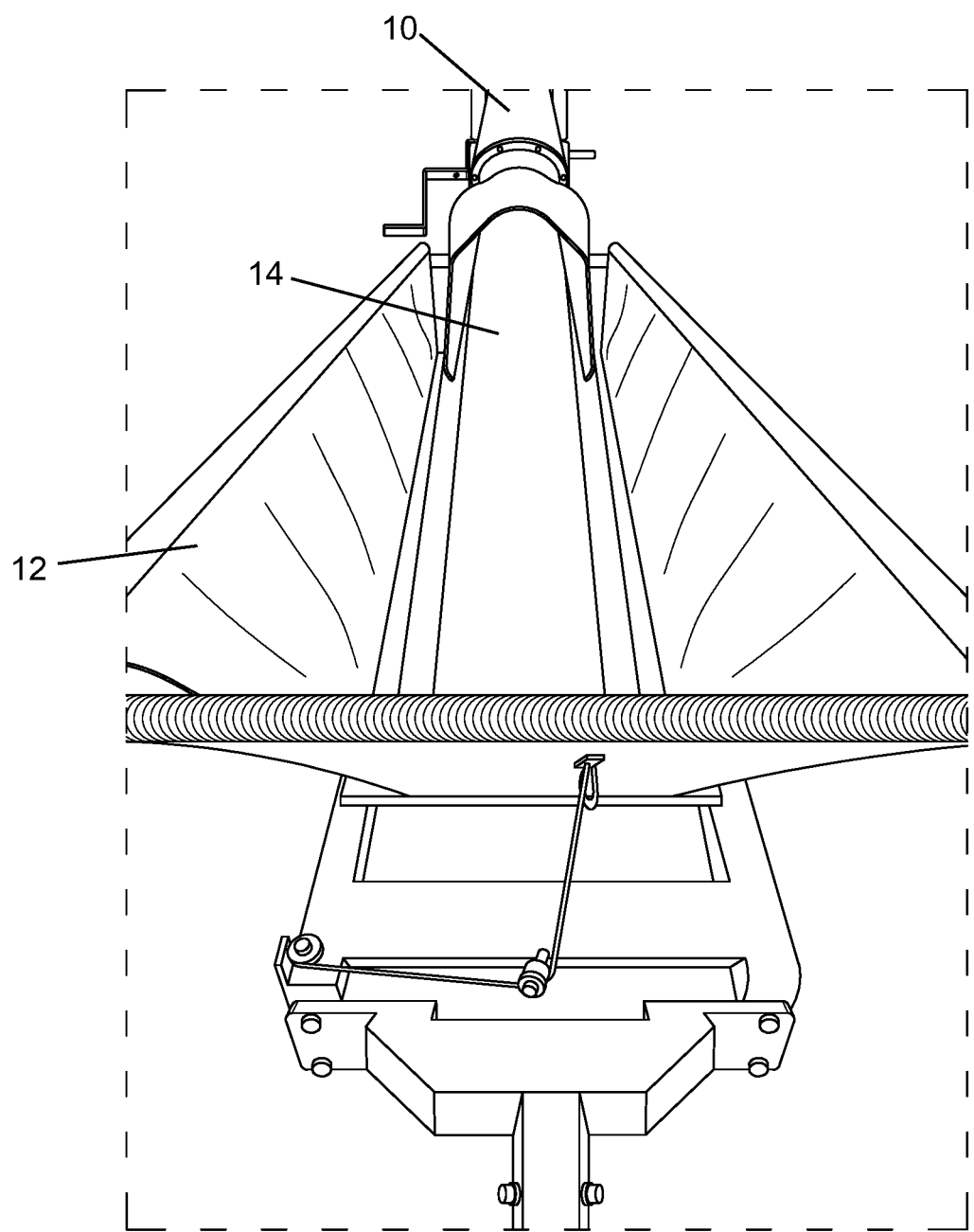
FIG. 2 is an end view of the tube conveyor.

An embodiment of the invention is directed to belting that is used in conjunction with a tube conveyor 10 to move objects. In certain embodiments, the tube conveyor 10 is used in conjunction with agricultural equipment. FIG. 1 illustrates a side view of the tube conveyor 10 on which the invention may be utilized. FIG. 2 illustrates a receiver 12 at an end of the tube conveyor 10.

Figure 4:
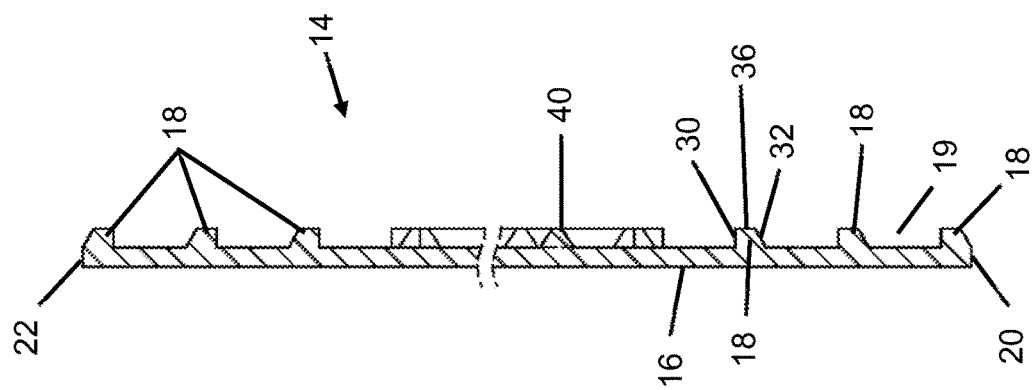
FIG. 4 is a sectional view of the belting taken along a line 4-4 in FIG. 3.
Figure 3:
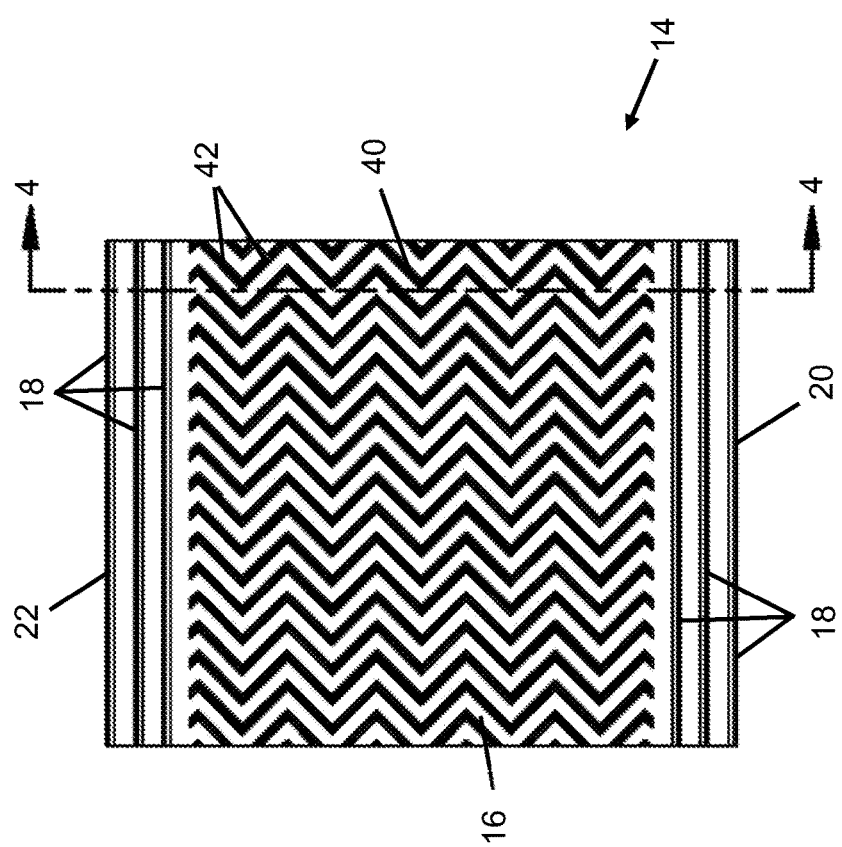
FIG. 3 is a top view of belting for the tube conveyor.

The belting 14 includes a first edge 20 and a second edge 22, as illustrated in FIGS. 3 and 4. While it is illustrated that the first edge 20 has a similar configuration as the second edge 22, it is possible for the belting 14 to be differently configured proximate the first edge 20 and the second edge 22.

The belting 14 is fabricated with a width based upon the tube conveyor 10 in which the belting 14 is intended to be used. In certain embodiments, the belting 14 has a width of between about 6 inches and about 24 inches. In other embodiments, the belting 14 has a width of between about 10 inches and about 20 inches. In still other embodiments, the belting 14 has a width of about 15 inches.

A person of skill in the art will appreciate that a variety of materials and processes may be used to fabricate the belting 14. Examples of suitable fabricating techniques include skim or friction coating at least one surface of a base 16 with a rubber material.

Proximate the first edge 20, at least one longitudinal cog 18 is provided on an upper surface of the base 16. In certain embodiments, a plurality of longitudinal cogs 18 are provided on the upper surface of the base 16.

Each of the longitudinal cogs 18 is substantially parallel to the first edge 20. As used herein, substantially parallel means that an angle between each of the longitudinal cogs 18 and the first edge 20 is less than about 5 degrees. In other embodiments, the angle between the longitudinal cogs 18 and the first edge 20 is 0 degrees.

In certain embodiments, there are at least two longitudinal cogs 18. In other embodiments, there are three or four longitudinal cogs 18 that are provided in a spaced-apart configuration proximate each of the first edge 20 and the second edge 22. In certain configurations, a spacing between each of the adjacent longitudinal cogs is approximately equal.

The longitudinal cogs 18 are positioned proximate the first edge 20 and the second edge 22 and extend towards a center of the belting 14. One of the longitudinal cogs 18 may be provided at the first edge 20 and the second edge 22, respectively.

In certain embodiments, extend over less than about ⅓ of the width of the belting 14. In other embodiments where the belting 14 has a width of about 15 inches, the width of the belting 14 over which the longitudinal cogs 18 extends is about 2 inches from the first edge 20 and the second edge 22.

In certain embodiments, each of the longitudinal cogs 18 has a substantially similar height. As used herein, substantially similar height means that a difference between the height of each of the longitudinal cogs 18 is less than about 10 percent of the height of the longitudinal cogs 18. In other embodiments, at least one of the longitudinal cogs 18 has a height that is different than the height of the other longitudinal cogs 18.

In certain embodiments, the longitudinal cogs 18 have a height of up to about 1 inch. In other embodiment, the longitudinal cogs 18 have a height of between about 0.05 inches and about 0.20 inches. In still other embodiments, the longitudinal cogs 18 have a height of between about 0.10 inches and about 0.15 inches.

In certain embodiments, the longitudinal cogs 18 have a width of up to about 1 inch. In other embodiment, the longitudinal cogs 18 have a width of between about 0.05 inches and about 0.20 inches. In still other embodiments, the longitudinal cogs 18 have a width of between about 0.10 inches and about 0.15 inches.

In certain embodiments, each of the longitudinal cogs 18 has a substantially similar width. As used herein, substantially similar width means that a difference between the width of each of the longitudinal cogs 18 is less than about 10 percent of the width of the longitudinal cogs 18. At least a portion of the longitudinal cogs 18 may have a height that is approximately equal to the width.

Each of the longitudinal cogs 18 includes an inner sidewall 30 and an outer sidewall 32, as most clearly illustrated in FIG. 4. As used herein, the inner sidewall 30 is oriented away from the first edge 20 and the outer sidewall 32 is oriented towards the first edge 20.

At least one of the inner sidewall 30 and the outer sidewall 32 may be oriented at an acute angle between an inner surface thereof and the base 16 so that a width of the longitudinal cog 18 proximate the belting 14 is greater than a width of the longitudinal cog 18 opposite the belting 14. In certain embodiment, the inner sidewall 30 and the outer sidewall 32 are oriented at an angle of up to about 15 degrees. In other embodiments, the inner sidewall 30 and the outer sidewall 32 are both oriented at an angle of between about 5 degrees and about 6 degrees. In other embodiments, the angle of the outer sidewall 32 is greater than the angle of the inner sidewall 30.

Proximate the intersection of the inner sidewall 30 and the outer sidewall 32 with the base 16, there may be a curved surface (not shown). In certain embodiments, curvature is at a radius of between about 0.04 inches and about 0.05 inches.

Each of the longitudinal cogs 18 may include an upper cog surface 36 that extends between the inner sidewall 30 and the outer sidewall 32 at an end of the longitudinal cog 18 that is opposite the base 16. While it is illustrated that the upper cog surface 36 is substantially linear, it is possible for the upper cog surface 36 to have alternative configurations, examples of which include rounded and pointed.

In certain embodiments, the upper cog surface 36 is oriented substantially parallel to the upper surface of the base 16. As used herein, substantially parallel means that an angle between the upper cog surface 36 and the upper surface of the base 16 is less than about 10 degrees. In other embodiments, the angle between the upper cog surface 36 and the upper surface of the base 16 is between about 2 degrees and about 0 degrees.

The longitudinal cogs 18 are positioned in a spaced-apart relationship so that a channel 19 is defined between each of the adjacent longitudinal cogs 18 as illustrated in FIGS. 3 and 4. The channels 19 restrict the ability of objects being moved on the tube conveyor 10 from falling off the first edge 20 and the second edge 22.

While not illustrated, a seal (not shown) may at least partially be received in the channel 19. In such a configuration, the channel 19 should have a width that is greater than a thickness of the seal. This configuration reduces the potential of objects being placed on the belting 14 from falling off the belting 14.

In certain embodiments, a width of the channels 19 is up to about 1 inch. In other embodiment, the width of the channels 19 is between about 0.25 inches and about 0.75 inches. In still other embodiments, the width of the channels 19 is between about 0.50 inches and about 0.70 inches.

While it is illustrated that the width of the channels 19 is approximately equal, the width of the channels 19 can be varied utilizing the concepts of the invention. In certain embodiments, the width of the channels 19 is between about 60 percent and about 120 percent of a width of the longitudinal cogs 18.

Intermediate the longitudinal cogs 18 proximate the first edge 20 and the second edge 22 is a central region of the belting 14 on which object being conveyed using the tube conveyor 10 are placed on the belting 14. To increase the volume of objects that may be conveyed with the tube conveyor 10 and/or to reduce movement of the objects on the tube conveyor 10, the belting 14 may include at least one cleat 40 that extends from an upper surface thereof.

The at least one cleat 40 extends across the width of the belting 14. In certain embodiments, a distance between an end of the at least one cleat 40 and the longitudinal cog 18 is approximately equal to the width of the channels 19.

Features of the at least one cleat 40 such as the height and spacing between adjacent cleats 40 are selected based upon factors that are known to persons of skill in the art such as the material that is being moved on the belting 14.

The at least one cleat 40 has a first end that is oriented towards the first edge 20. A distance between the first cleat end and the longitudinal cog 18 that is closest to the at least one cleat 40 is approximately equal to a distance between adjacent longitudinal cogs 18.

The at least one cleat 40 may have a zig-zag configuration that includes a plurality of cleat sections 42. The cleat sections 42 may intersect each other to form a continuous cleat that extends across the belting 14. Each of the cleat sections 42 may be formed with a similar length. In certain embodiments, adjacent cleat sections 42 are oriented at an angle of about 90 degrees with respect to each other in an alternating pattern that provides the at least one cleat 40 with the zig-zag shape.

In certain embodiments, the at least one cleat 40 includes a plurality of cleats that are positioned on the base 16 in a spaced-apart configuration. In other embodiments, the spacing between each of the cleats 40 is approximately equal.

In one embodiment, a spacing between the adjacent cleats 40 is between about 1 time and about 2 times a width of the cleat 40. In other embodiments, the spacing between the cleats 40 is larger.

In certain embodiments, the height of the at least one cleat 40 is approximately equal to a height of the longitudinal cogs 18. In other embodiments, the height of the at least one cleat 40 is greater than the height of the longitudinal cogs 18.

As the product is moved using the tube conveyor 10, the product is at least partially positioned in the spacing between the cleats 40 to restrict movement of the product with respect to the conveyor belt 14. Furthermore, the shape of the cleat sections 42 restricts lateral movement of the product with respect to the conveyor belt 14.

As an alternative to directly attaching the longitudinal cogs 18 to the base 16, it is possible for the longitudinal cogs 18 to be attached to a cog support (not shown) that is then attached to the base 16. In certain embodiments, the cog support has a width that is larger than the overall width of the longitudinal cogs 18. The cog support may facilitate forming the longitudinal cogs 18 as a unit which is then attached to the base 16. The cog support may thereby enhance the ability to accurately attach the longitudinal cogs 18 to the base 16. The cog support may also enhance the adherence of the longitudinal cogs 18 to the base 16.

In use, product flows onto the tube conveyor 10 from a direction that is generally perpendicular to the direction at which the belting 14 moves. Movement of the belting 14 in the tube conveyor 10 conveys the product. If the product moves towards the first edge 20 or the second edge 22, the product falls into one of the channels 19, which thereby reduces the potential of the product falling off of the belting 14.

It is undesirable for the product to fall off the belting 14 because the product that falls off the belting 14 reduces the amount of product that is delivered to a customer, for example. Additionally, product that falls off the belting 14 may impact the operation of the tube conveyor 10 such as by gumming up rollers over which the belting 14 moves. Additionally, the presence of the product on an underside of the belting may negatively impact the useful life of the belting 14 such as by causing the belting 14 to shrink.

In configurations where the seal extends into the channel 19, the product is prevented from falling off the first edge 20 of the belting 14 in a portion of the belting 14 where the end of the seal is in the channel 19.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A tube conveyor comprising:
a tube having a bore extending therethrough; and
a conveyor belt that is movable through the tube bore, wherein the conveyor belt comprises:
a base having a first edge, wherein the base has a surface; and
at least one first longitudinal cog extending from the base surface, wherein the at least one first longitudinal cog is oriented substantially parallel to the first edge;
the at least one first longitudinal cog comprises an inner sidewall, an outer sidewall and an upper cog surface that extends between the inner sidewall and the outer sidewall, wherein the inner sidewall is oriented away from the first edge and wherein the outer sidewall is oriented towards the first edge; and
the inner sidewall and the outer sidewall are both oriented at angle of up to about 15 degrees and wherein the angle of the outer sidewall is greater than the angle of the inner sidewall.

2. The tube conveyor of claim 1, wherein the conveyor belt further comprises at least one cleat that extends from the base surface, wherein the at least one cleat comprises a first end that is oriented towards the first edge and wherein a distance between adjacent longitudinal cogs is approximately equal to a distance between the cleat first end and the longitudinal cog that is closest to the at least one cleat.

3. The tube conveyor of claim 1, wherein the at least one first longitudinal cog comprises a plurality of longitudinal cogs that are provided on the base surface in a spaced-apart relationship.

4. The tube conveyor of claim 3, wherein a channel is formed between adjacent cogs.

5. The tube conveyor of claim 3, wherein the plurality of longitudinal cogs is coupled to the base surface.

6. The tube conveyor of claim 1, wherein the conveyor belt further comprises at least one cleat extending from the base surface.

7. The tube conveyor of claim 6, wherein a height of the at least one cleat is approximately equal to a height of the at least one first longitudinal cog.

8. The tube conveyor of claim 6, wherein the at least one cleat comprises a plurality of cleats that are provided on the base surface in a spaced-apart relationship so that a spacing between adjacent cleats is approximately equal.

9. The tube conveyor of claim 6, wherein the at least one cleat comprises a plurality of cleat sections, wherein adjacent cleat sections are oriented at an angle with respect to each other and wherein each of the cleat sections has an approximately equal length, wherein the angle is about 90 degrees and wherein the cleat sections form a zigzag pattern.

10. The tube conveyor of claim 1, wherein the base further comprises a second edge that is opposite the first edge, wherein the conveyor belt further comprises at least one second longitudinal cog extending from the base surface, wherein the at least one second longitudinal cog is oriented substantially parallel to the second edge.

11. A method of conveying product in a tube conveyor comprising:
providing a tube conveyor comprising a tube and a conveyor belt, wherein the tube has a bore extending therethrough, wherein the conveyor belt comprises a base and at least one first longitudinal cog, wherein the base has a first edge and a surface, wherein the at least one first longitudinal cog extends from the base surface and wherein the at least one first longitudinal cog is oriented substantially parallel to the first edge;
placing product on the conveyor belt;
moving the conveyor belt through the tube bore to convey the product with the tube conveyor;
restricting lateral movement of the product on the conveyor belt as the conveyor belt is moving through the tube bore with the at least one longitudinal cogs;
the conveyor belt further comprises at least one cleat that extends from the base surface and wherein the at least one first longitudinal cog is closer to the first edge than the at least one cleat;
the conveyor belt further comprises at least one cleat that extends from the base surface, wherein the at least one cleat comprises a first end that is oriented towards the first edge, wherein the at least one first longitudinal cog comprises a plurality of longitudinal cogs that are provided on the base surface in a spaced-apart relationship, and wherein a distance between adjacent longitudinal cogs is approximately equal to a distance between the cleat first end and the at least one first longitudinal cog that is closest to the at least one cleat.

12. The method of claim 11, wherein the at least one cleat comprises a plurality of cleats that are provided on the base surface in a spaced-apart relationship and wherein the method further comprises retaining the product being conveyed with the tube conveyor by at least partially positioning the product in the spacing between the adjacent cleats.

13. The method of claim 11, wherein the at least one cleat comprises a plurality of cleat sections, wherein adjacent cleat sections are oriented at an angle with respect to each other and wherein each of the cleat sections has an approximately equal length, wherein the angle is about 90 degrees, wherein the cleat sections form a zigzag pattern and wherein the method further comprises restricting lateral movement of the product on the conveyor belt with the cleat sections.

14. The method of claim 11, wherein the base further comprises a second edge that is opposite the first edge, wherein the conveyor belt further comprises at least one second longitudinal cog extending from the base surface, wherein the at least one second longitudinal cog is oriented substantially parallel to the second edge and wherein the at least one second longitudinal cog is closer to the second edge than the at least one cleat.

15. The method of claim 11, wherein the at least one first longitudinal cog comprises a plurality of longitudinal cogs that are provided on the base surface in a spaced-apart relationship, forming a channel is formed between adjacent cogs and wherein the method further comprises extending a seal into the channel.

16. The method of claim 15, wherein placing the product on the conveyor comprises moving the product over the seal and wherein the seals prevents the product from falling off the first edge in a portion of the conveyor belt where the end of the seal is in the channel.

* * * * *